United States Patent [19]
McCanse et al.

[11] 3,768,572
[45] Oct. 30, 1973

[54] STRUCTURE FOR ELIMINATING MUD COLLECTIONS IN FARM IMPLEMENTS

[75] Inventors: James E. McCanse; Frederick L. Faber; Ivan E. Bauer, all of Oregon, Ill.

[73] Assignee: Hesston Corporation, Hesston, Kan.

[22] Filed: Jan. 21, 1972

[21] Appl. No.: 219,689

[52] U.S. Cl. .................. 172/112, 172/508, 171/137
[51] Int. Cl. ............................................ A01b 33/00
[58] Field of Search .................. 172/112, 118–123, 172/612, 508–510; 171/137

[56] References Cited
UNITED STATES PATENTS

| | | | |
|---|---|---|---|
| 2,739,517 | 3/1956 | Roberts | 172/112 X |
| 2,364,043 | 12/1944 | Ariens | 172/112 X |
| 2,616,348 | 11/1952 | Ariens | 172/112 X |
| 3,347,188 | 10/1967 | Richey | 172/112 X |
| 3,542,133 | 11/1970 | Lely | 172/112 X |
| 3,557,879 | 1/1971 | Lely et al. | 172/112 X |

FOREIGN PATENTS OR APPLICATIONS

| | | | |
|---|---|---|---|
| 252,068 | 5/1963 | Australia | 172/212 |

Primary Examiner—Edgar S. Burr
Assistant Examiner—Eugene H. Eickholt
Attorney—Schmidt, Johnson, Hovey & Williams

[57] ABSTRACT

An inclined, tiltable, "live" guard of flexible material is positioned behind the rotating blades of a cultivator or tillage implement within the paths of materials such as dirt, mud, vegetation and debris flung upwardly and rearwardly by the blades to prevent accumulation, buildup and packing of the materials between the blades and the implement parts thereabove and therebehind. The flexure of the guard by impact of the materials thereon or by intermittent engagement of the blades with the accumulated materials and/or with the guard itself causes the materials to break away, eliminating the need for manual digging away of the buildup from time to time by the operator. An adequate outlet and proper spacing also permit the materials to gravitate downwardly and rearwardly along the top surface of the guard.

3 Claims, 3 Drawing Figures

STRUCTURE FOR ELIMINATING MUD COLLECTIONS IN FARM IMPLEMENTS

The present invention relates to the elimination of the troublesome, time-consuming and aggravating chore of digging away mud and other materials which accumulate and pack tightly between the rotating, ground working blades and the structural parts of farm implements located above and behind the blades.

Rotating, ground-engaging tools of farm machinery constantly fling and project dirt, mud, rocks and vegetation upwardly and rearwardly, necessitating the use of intercepting hoods and shields. However, such necessary intercepting structure creates a mud accumulation problem whenever the soil and/or vegetative moisture conditions are such as to cause sticking. Once adherence commences, the buildup continues until the blades act as trowels, packing the mud so tightly between the blades and the hood that considerable time and hard work are needed to dig it loose. Many solutions have been suggested over a long period of time; none has been entirely successful.

It is, therefore, an important object of the present invention to provide for structure strategically located and of such nature as to cause the accumulations to break loose automatically, permitting continuous and uninterrupted use of the implement regardless of the conditions of the terrain in which the rotating tool must work.

Another important object of the present invention is to provide a novel, inexpensive guard which is so live (flexible, pliable and yielding) throughout virtually its entire expanse as to shed itself of mud as fast as it tends to build up, all without operator attention or need for delays.

Still another important object of the present invention is to provide a guard of the aforementioned nature that is adapted for location in a position where it fully protects those parts of the implement upon which mud accumulation would otherwise occur.

Figure 2:
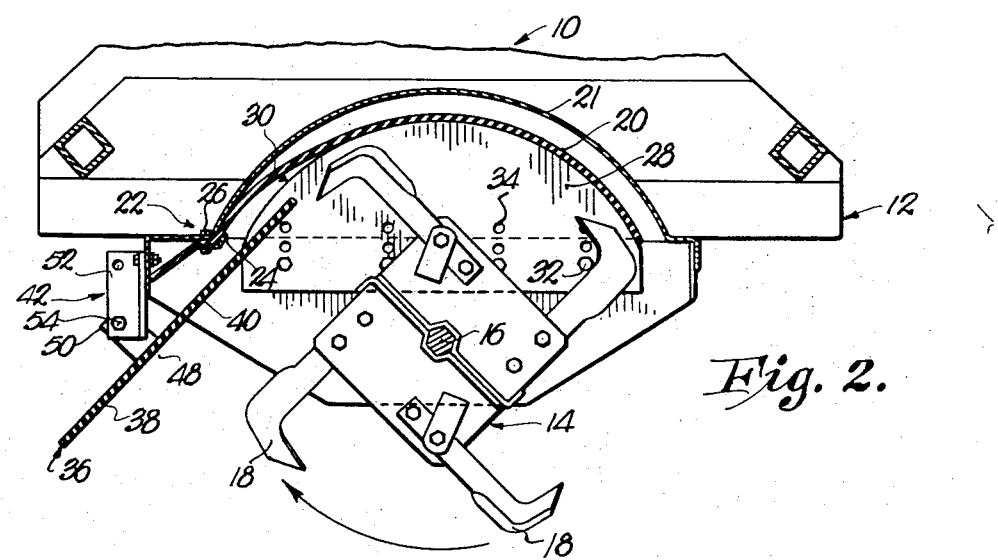
FIG. 2 is a cross-sectional view taken on line 2—2 of FIG. 1.
Figure 3:
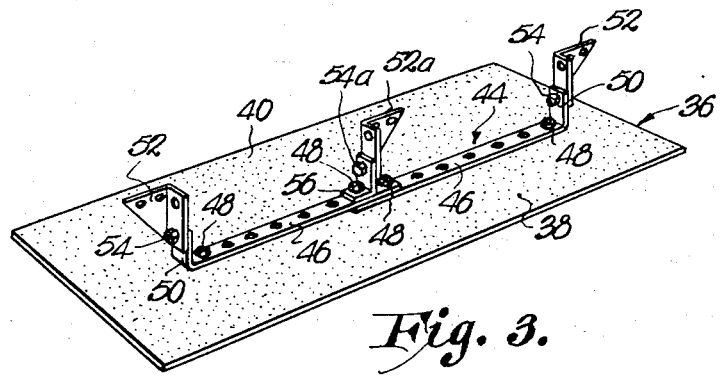
FIG. 3 is a perspective view of the guard removed from the implement.

Farm implement 10 has a frame 12 carrying a ground-engaging tool 14 rotated clockwise, viewing FIG. 2, about an elongated, normally horizontal axis 16, and provided with a number of longitudinally spaced sets of four circumferentially spaced tillage or cultivator blades 18. A flexible member 20 overlying tool 14, and a metal hood 21 above the web member 20, have a rigid rear mount 22 to frame 12 which includes elongated clips 24 throughout the length of tool 14 and spaced fasteners 26. Upstanding plates 28, having arcuate edges 30 supporting member 20, are secured to frame 12 by fasteners 32 passing through selective adjustment holes 34.

Structure for preventing accumulation on mount 22 of materials which are flung upwardly and rearwardly by blades 18 during rotation of tool 14 includes an elongated, flexible guard 36, coextensive in length with tool 14, and disposed to intercept and rebound such materials. Guard 36 has a portion 38 and a wider portion 40, the latter of which (or alternatively, the portion 38) is interposed between mount 22 and tool 14, preferably in spaced relation to mount 22.

The downwardly and rearwardly inclined guard 36 has an intermediate, longitudinally extending, rigid support 42 between portions 38 and 40, but is otherwise live, i.e., fully yieldable, flexible and somewhat pliable, throughout its expanse around the support 42. Support 42 includes a number of L-shaped straps 44, having legs 46 clamped to the back of guard 36 by fasteners 48, and legs 50 normal to legs 46. Legs 50 are attached to L-shaped brackets 52, secured to and depending from frame 12 behind mount 22, by bolt and nut assemblies 54. Support 42 may also include intermediate brackets 52a having bolt and nut assemblies 54a attaching legs 46 thereto by L-shaped secondary brackets 56.

In operation, mud, dirt, debris and other material are flung by the blades 18 against the lower surfaces of guard 36 and member 20 and rebounded downwardly thereby. The force of such material flexes, deforms and vibrates the guard 36 and the member 20 by virtue of the inherent characteristics thereof, thereby preventing such material from adhering to and accumulating on the guard 36 and the member 20.

In absence of the guard 36 and the member 20, the materials, under many conditions of moisture content, quickly and continuously build up throughout the lower surface of hood 21, whereupon the blades 18 wipe and trowel the materials into a hard, compact condition, requiring a difficult and time-consuming removal task. If member 20 alone is used, then the buildup takes place along the mount 22 such that member 20 becomes only a partial solution to the problem.

Accordingly, best results are obtained by making the member 20 and the guard 36 from any one of a number of solid or reinforced leather, rubber or synthetic materials such as those commonly used in the manufacture of belting employed, for example, in conveyors and the like, including coated or impregnated base fabrics, whether corded, webbed, woven, molded or otherwise produced. Manifestly, the chosen materials must be strong and tough so as to be capable of resisting the abrasion to which the same are subjected, sufficiently flexible and pliable to cause materials building up thereon to break loose, and rigid enough to retain the shapes thereof as illustrated in the drawing.

However, if the mud on the member 20 and the guard 36, or other materials which tend to adhere thereto, such as is caused from sap and juices of weeds and other growth, fail to break loose solely by the flexing action above explained, then adjustments can be made to cause blades 18 to enhance the cleaning action. Plates 28 may be lowered by repositioning of fasteners 32 and guard 36 may be tilted by loosening of assemblies 54 and 54a such as to cause blades 18 to intermittently engage member 20 and portion 40 of guard 36. The striking and beating action of blades 18 not only cleans the adhered material away but, equally as important, augments the flexure of member 20 and guard 36 such as to preclude excessive accumulation on the lower surfaces of member 20 and guard 36 as well as between mount 22 and guard 36.

Figure 1:
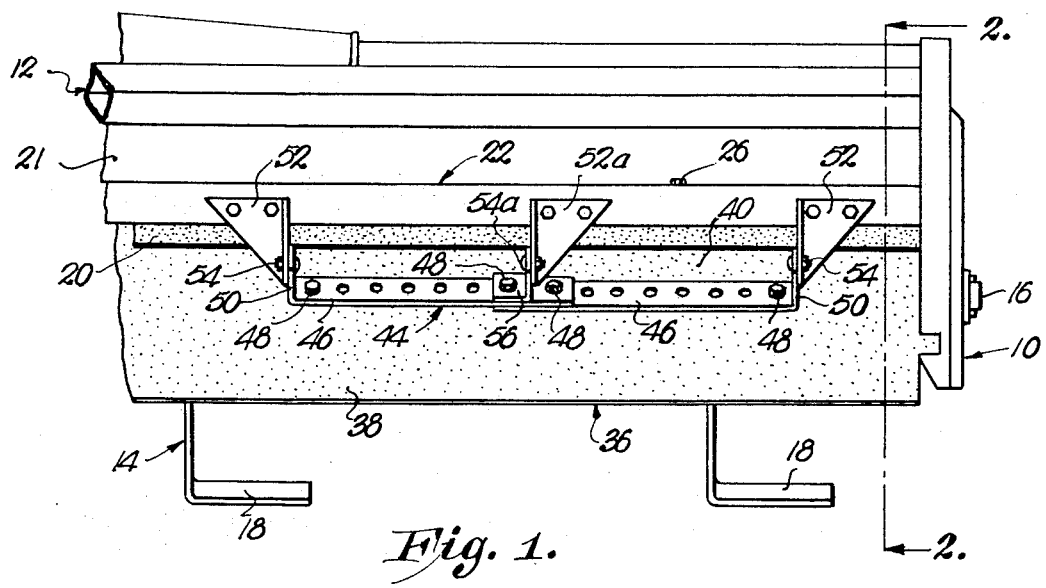
FIG. 1 is a fragmentary rear elevational view of a farm implement provided with structure for eliminating mud collections made in accordance with the present invention.

While assemblies 54 and 54a are capable of holding guard 36 tilted in seleced positions, in the event of any abnormal condition, such as large rocks or other heavy objects being raised by blades 18 against guard 36, it will pivot about assemblies 54 and 54a and not become damaged. Moreover, guard 36 may be quickly and easily reversed, placing portion 38 above and portion 40 below assemblies 54 and 54a if operating conditions are such that the guard 36 will then become more effective. In either event, the upper edge of guard 36 should usually be kept spaced from member 20 to allow dirt and accumulations to gravitate freely along the top surface of guard 36. Usually the portion 40 will be located as shown in FIGS. 1 and 2 when implement 10 is used for tilling and reversed when implement 10 is used for cultivation.

While assemblies 54 and 54a are shown in FIG. 2 spaced rearwardly from, parallel to and in about the same horizontal plane as axis 16, they may be located at slightly higher or lower elevations if desired. More importantly, the support provided by brackets 52, 52a and 56, by legs 50 and by assemblies 54 and 54a is such as to be protected by guard 36 against material flung by blades 18, and also to permit free gravitation of material from the upper surface of guard 36.

Oftentimes, when implement 10 is used in connection with row crops, pairs of upright protective shields (not shown) are mounted on frame 12 and extended rearwardly below mount 22. In that event, the guard 36, instead of being continuous throughout the length of hood 21, may be sectionalized or otherwise altered to clear the shields.

Having thus described the invention, what is claimed as new and desired to be secured by Letters Patent is:

1. In a farm implement having a frame, a rotatable, ground-engaging tool on the frame which tends to fling materials upwardly and rearwardly during operation of the tool, and a hood disposed in overlying relationship to the axis of rotation of the tool by virtue of a rigid rear mount, structure for preventing accumulation of said materials along said mount, said structure comprising:
   a planar, flexible guard having a pair of opposed marginal ends; and
   a support on said frame disposed rearwardly of said axis, the hood, and said mount and supporting said guard in an inclined attitude with one of said marginal ends thereof projecting upwardly from the support between said mount and the tool,
   said one marginal end of the guard being free with respect to the support and being spaced from the mount along a line extending between said axis of the tool and the mount whereby said one marginal end may flex about said support to preclude material build up.

2. In an implement as claimed in claim 1, said support being disposed intermediate said marginal ends and the guard being otherwise live throughout its expanse.

3. In an implement as claimed in claim 1, wherein said support includes means releasably holding said guard in any one of a number of selected, inclined attitudes for varying the position of said one marginal end of the guard with respect to the tool.

* * * * *